May 15, 1956            G. L. FOGAL            2,745,615

PARACHUTE

Filed Aug. 31, 1951                          2 Sheets-Sheet 1

INVENTOR.
GORDON L. FOGAL
BY
ATTYS.

May 15, 1956           G. L. FOGAL           2,745,615
PARACHUTE
Filed Aug. 31, 1951           2 Sheets—Sheet 2
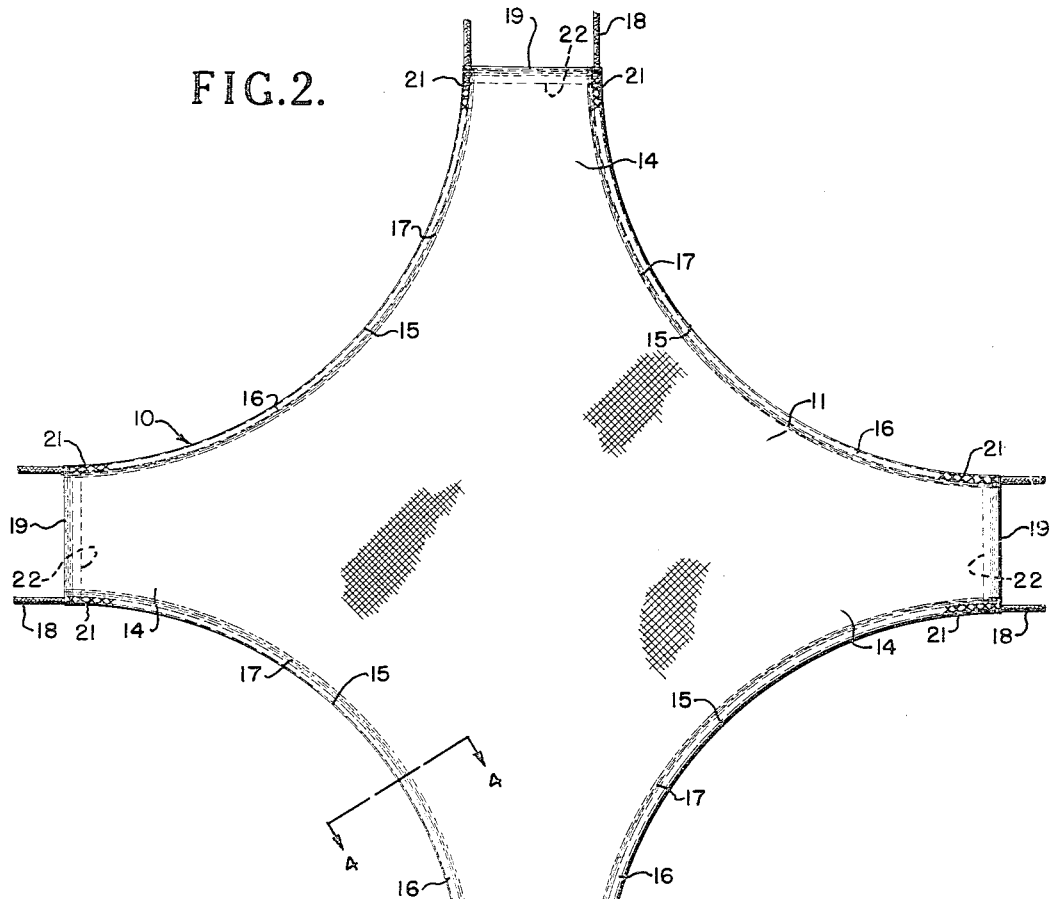
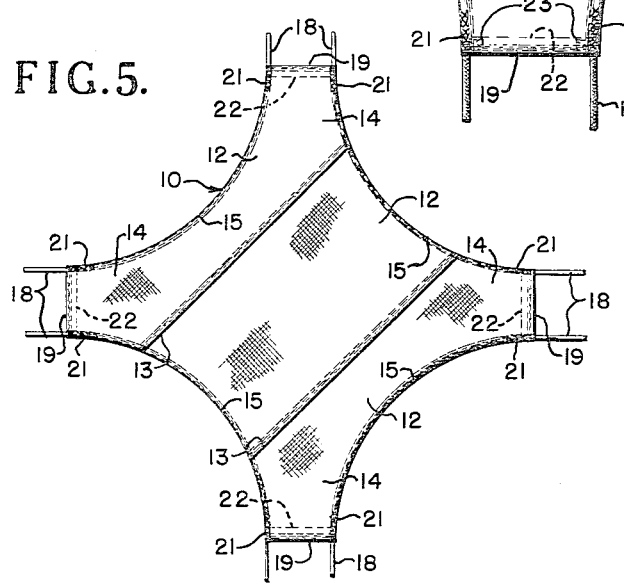
INVENTOR.
GORDON L. FOGAL
BY
G. O. O'Brien
R. M. Hicks ATTYS.

United States Patent Office 2,745,615
Patented May 15, 1956

2,745,615

PARACHUTE

Gordon L. Fogal, Silver Spring, Md.

Application August 31, 1951, Serial No. 244,680

3 Claims. (Cl. 244—145)

(Granted under Title 35, U. S. Code (1952), sec. 266)

The present invention relates to parachutes and more particularly to a parachute canopy which may be composed of one or more pieces and having a plurality of hyperbolic or quadrantal curved cut-out portions at the perimeter thereof and defining leg portions therebetween.

Prior art parachutes usually are constructed of a plurality of specially shaped gore sections joined together by a multiplicity of stitched seams and are of such complicated construction as to be costly to manufacture.

The present invention comprises a parachute canopy of flat, simple construction, the number of pieces of material being governed only by the size of the canopy and the width of the material employed in the construction thereof. By eliminating the inefficient drag producing areas at the cut-out portions, a much greater drag per unit of area is produced in the improved canopy of the present invention. This canopy construction provides for venting pressure oscillations and peaks developed within the canopy, thus reducing the shock load on the canopy and increasing the stability thereof.

An object of the present invention is to provide a new and improved parachute canopy wherein the drag per unit of area is substantially increased.

Another object is to provide an improved parachute having increased stability and in which the shock load on opening is decreased.

Still another object is to provide an improved parachute in which the shroud lines are attached to the canopy in a novel manner to distribute the load more uniformly throughout the canopy.

A further object is to provide a parachute having pocket bands attached to the leg portions thereof thus ensuring complete inflation of the canopy.

A still further object is to provide a parachute canopy construction which is strong, durable and economical to manufacture.

Other objects and many of the attendant advantages of this invention will be readily appreciated as the same becomes better understood by reference to the following detailed description when considered in connection with the accompanying drawings wherein:

Fig. 2 is a plan view of the parachute and showing the canopy laid out flat;

Fig. 5 is a view similar to Fig. 2 and illustrating an alternative form of the invention.

Figure 1:
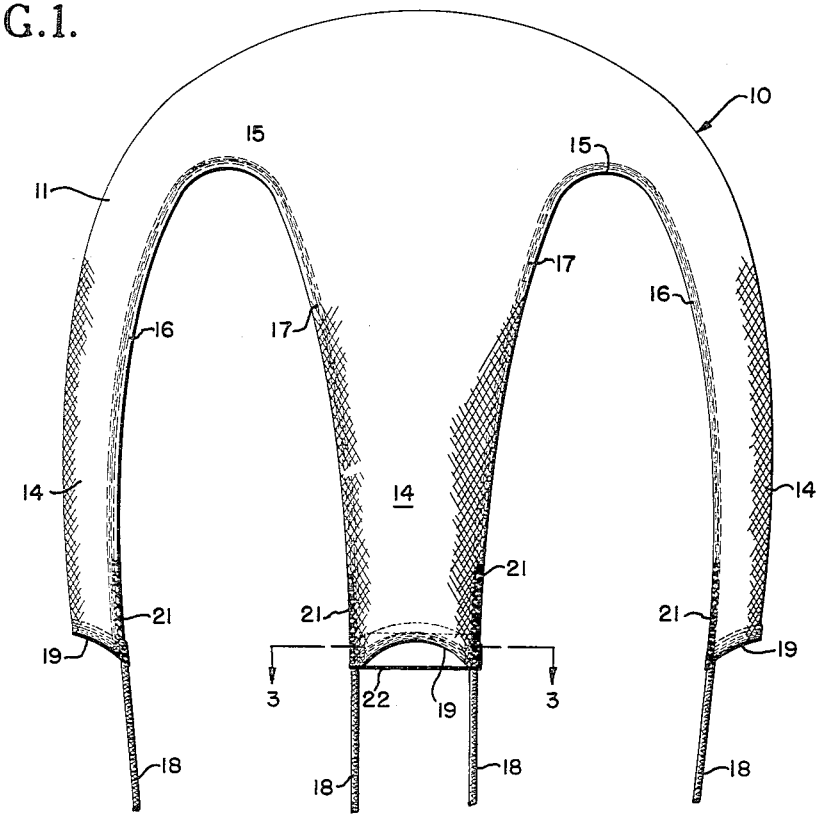
Fig. 1 is a side elevation of the parachute of the present invention.

Referring more particularly to the drawings wherein like numerals indicate like parts throughout the several views, 10 indicates generally the canopy of the present invention which is preferably formed of a single bias-cut flat piece of fabric material 11 as illustrated in the embodiment of the invention illustrated in Fig. 2, or it may be formed of a plurality of bias-cut strips 12 of fabric material stitched together at the edges thereof as at 13 in the alternative form of the invention illustrated in Fig. 5.

The canopy 10 has, as indicated particularly in Fig. 2, four leg members 14, each of which has curved sides merging with the next adjacent member 14 to form substantially quadrantal curved cut-out portions 15. It is, of course, understood that the curved portions may be modified from arcuate to elliptical without departing from the spirit of the invention. The fabric 11 is turned back around the periphery of the cut-out portions 15 to form tunnel hems 16, the hems 16 being secured by rows of stitching 17.

Shroud lines 18 pass into the tunnel hems 16 at the extremity 19 of each of the leg members 14, around the adjacent cut-out portion 15 and out of the next adjacent leg member at the extremity 19 thereof. The ends of each of the shroud lines are joined together in any well-known manner a suitable distance from the canopy for attachment to a load (not shown). Zig-zag stitching 21 is employed through the tunnel hems 16 adjacent the ends thereof to secure the shroud lines 18 therein against endwise movement.

Figure 3:
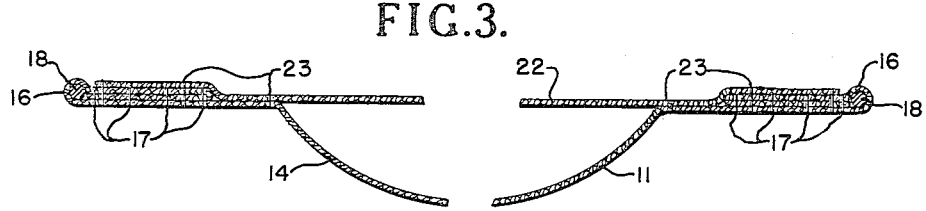
Fig. 3 is a sectional view taken along the line 3—3 of Fig. 1 and showing one of the pocket bands.
Figure 4:
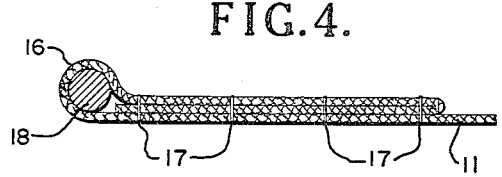
Fig. 4 is a sectional view taken along the line 4—4 of Fig. 2 and showing one of the shroud line tunnel hems.

In order to ensure the complete inflation of the canopy 10 during the descent thereof, each of the leg members 14 has a pocket band or tape 22 secured thereto on the inside and across the width of the extremity 19 thereof as by stitching 23, the stitching 23 being placed at each end of tapes 22. As shown in Fig. 3, the tapes 22 are shorter than the width of extremities 19 of leg members 14, thus the leg members, when inflated, bow outwardly thus scooping air into the leg members and assisting in inflating the canopy.

While the canopy of the present invention is economical to manufacture by reason of the simplicity of construction, it has a high drag and is stable in flight.

In the parachute of the present invention the use of a minimum number of seams and pieces of material in construction of the canopy provides a canopy which has reduced bulk and is much stronger than prior art canopies by reason of the reduced amount of discontinuities in the fabric.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed and desired to be secured by Letters Patent of the United States is:

1. A parachute for supporting a load and comprising, in combination, a canopy for said parachute having at the periphery thereof a plurality of curved quadrantal cut-out portions forming therebetween a plurality of extended leg members, said leg members being of substantial width and terminating in a hem which is substantially normal to the curve of said adjacent cut out portion at the outer extremity thereof, tunneled hems stitched around the periphery of said cut-out portions and extending from the outer extremity of each of said leg members to the outer extremity of the next adjacent leg member, shroud lines passing through each of said tunneled hems respectively and extending beyond said leg members to a parachute load, stitching for securing said shroud lines against movement within said hems, transversely disposed pocket bands secured at the ends thereof to the curved portion of said leg members at the outer extremities thereof, said pocket bands being of a length shorter than the width of the extremities of said leg members whereby the leg members are inflated during the descent of the parachute.

2. A parachute for supporting a load comprising, a canopy formed of a flat sheet of material and having a plurality of extended leg members of substantial width defining deeply curved cut-out portions therebetween, tunnel seams extending along the sides of said leg members and continuing from the extremity of each leg member around the periphery of the canopy at the cut-out portion to the extremity of the next adjacent leg member, a plurality of shroud lines respectively passing through said tunnel seams, said shroud lines being secured to the canopy at the ends of said tunnel seams and extending therefrom, said tunnel seams providing for wide distribution in the canopy of supporting stresses, tapes respectively secured at the ends thereof to the sides of said leg members and extending across the outer extremities thereof, said tapes being shorter than the width of said leg members whereby the leg members are inflated as the parachute descends.

3. A parachute for supporting a load comprising, in combination, a flat square blank of fabric material having substantially quadrantal cut-out portions at the four corners thereof, said cut-out portions defining leg members therebetween, tunnel hems formed around the periphery of said cut-out portions, shroud lines threaded through said hems and extending a distance beyond the ends of said hems and tapes of substantial width respectively secured at the ends thereof to the sides of said leg members and extending across the outer extremities thereof, said tapes being shorter than the width of said leg members whereby the leg members are adapted to be inflated as the parachute descends.

References Cited in the file of this patent

UNITED STATES PATENTS

| | | |
|---|---|---|
| 1,834,370 | Askam | Dec. 1, 1931 |
| 2,309,107 | Giroux | Jan. 26, 1943 |
| 2,365,184 | Frieder et al. | Dec. 19, 1944 |
| 2,494,600 | Weinig | Jan. 17, 1950 |
| 2,517,417 | Quilter | Aug. 1, 1950 |

FOREIGN PATENTS

| | | |
|---|---|---|
| 569,620 | Great Britain | June 1, 1945 |